US008367568B2

(12) United States Patent
Bradley et al.

(10) Patent No.: US 8,367,568 B2
(45) Date of Patent: *Feb. 5, 2013

(54) WET WIPES HAVING A LIQUID WIPE COMPOSITION WITH AN ORGANOPOLYSILOXANE

(75) Inventors: Elizabeth Oriel Bradley, Neenah, WI (US); Troy Michael Runge, Neenah, WI (US); Steven Michael Hurley, Neenah, WI (US); Christopher James Uecker, Appleton, WI (US); Corey Thomas Cunningham, Larsen, WI (US); Nathan John Vogel, Neenah, WI (US); Timothy James Van Himbergen, Appleton, WI (US); William Clayton Bunyard, De Pere, WI (US); Dave Allen Soerens, Neenah, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/220,125

(22) Filed: Aug. 29, 2011

(65) Prior Publication Data

US 2011/0312236 A1 Dec. 22, 2011

Related U.S. Application Data

(63) Continuation of application No. 12/421,957, filed on Apr. 10, 2009, now Pat. No. 8,030,226.

(51) Int. Cl.
*B32B 5/02* (2006.01)
*B32B 27/04* (2006.01)
*B32B 27/12* (2006.01)

(52) U.S. Cl. ............ 442/97; 442/99; 442/101; 424/400; 424/401

(58) Field of Classification Search ............... 442/97, 442/99, 101
See application file for complete search history.

(56) References Cited

U.S. PATENT DOCUMENTS

| 4,100,324 | A |   | 7/1978  | Anderson et al. |
| 4,667,890 | A |   | 5/1987  | Gietman, Jr. |
| 4,753,844 | A |   | 6/1988  | Jones et al. |
| 4,904,524 | A | * | 2/1990  | Yoh ................................. 442/61 |
| 4,940,626 | A |   | 7/1990  | Rhodes, III et al. |
| 5,284,703 | A |   | 2/1994  | Everhart et al. |
| 5,350,624 | A |   | 9/1994  | Georger et al. |
| 5,508,102 | A |   | 4/1996  | Georger et al. |
| 5,540,332 | A |   | 7/1996  | Kopacz et al. |
| 5,648,083 | A |   | 7/1997  | Blieszner et al. |
| 5,756,112 | A | * | 5/1998  | Mackey .......................... 424/402 |
| 5,763,332 | A |   | 6/1998  | Gordon et al. |
| 5,914,177 | A |   | 6/1999  | Smith, III et al. |
| 5,948,540 | A |   | 9/1999  | Mackey et al. |
| 6,083,854 | A |   | 7/2000  | Bogdanski et al. |
| 6,168,852 | B1 |  | 1/2001  | Smith, III et al. |
| 6,203,898 | B1 | * | 3/2001  | Kohler et al. .................. 428/339 |
| 6,410,039 | B1 |  | 6/2002  | Walker |
| 6,423,804 | B1 |  | 7/2002  | Chang et al. |
| 6,515,095 | B1 | * | 2/2003  | Omura et al. .................... 528/38 |
| 6,651,924 | B2 |  | 11/2003 | Gingras et al. |
| 6,653,406 | B1 |  | 11/2003 | Soerens et al. |
| 6,733,773 | B1 |  | 5/2004  | Hsu et al. |
| 6,905,748 | B2 | * | 6/2005  | Sosalla .......................... 428/43 |
| 6,930,080 | B2 |  | 8/2005  | Moodycliffe et al. |
| 6,946,413 | B2 |  | 9/2005  | Lange et al. |
| 7,166,235 | B2 |  | 1/2007  | Majeti et al. |
| 7,365,030 | B2 |  | 4/2008  | Chamba et al. |
| 7,378,382 | B2 |  | 5/2008  | Serobian et al. |
| 8,030,226 | B2 | * | 10/2011 | Bradley et al. .................. 442/97 |
| 2003/0022568 | A1 |  | 1/2003  | Branham et al. |
| 2003/0026963 | A1 |  | 2/2003  | Chang et al. |
| 2003/0027270 | A1 |  | 2/2003  | Baker et al. |
| 2003/0032352 | A1 |  | 2/2003  | Chang et al. |
| 2003/0045645 | A1 |  | 3/2003  | Chang et al. |
| 2003/0055146 | A1 |  | 3/2003  | Chang et al. |

(Continued)

FOREIGN PATENT DOCUMENTS

EP    1 426 398 A1   6/2004
WO    WO 2004/006879 A1   1/2004

OTHER PUBLICATIONS

American Society for Testing Materials (ASTM) Designation: D 646-96 (Reapproved 2001), "Standard Test Method for Grammage of Paper and Paperboard (Mass Per Unit Area)," pp. 1-5, published Mar. 1966.

(Continued)

Primary Examiner — Lynda Salvatore
(74) Attorney, Agent, or Firm — H. Michael Kubicki

(57) ABSTRACT

The present disclosure generally relates to wet wipes having liquid wipe compositions that including an organopolysiloxane that reduces sheet-to-sheet adhesion, improves the stack height, increases flexibility and maintains strength in the wet wipe. The liquid wipe compositions include an organopolysiloxane having the following structure:

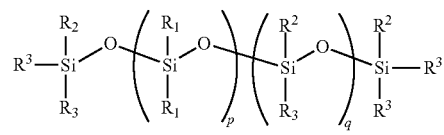

wherein p+q=1 to 2000, $R^1$ is independently selected from a monovalent hydrocarbon group or hydroxyl group, and $R^2$ and $R^3$ are independently selected from a monovalent hydrocarbon group, a hydroxyl group, a monovalent hydrocarbon group functional in amine, a monovalent hydrocarbon group functional in polyether, a monovalent hydrocarbon group functional in quaternary, and a monovalent hydrocarbon group functional in polyampholyte.

17 Claims, No Drawings

U.S. PATENT DOCUMENTS

| | | |
|---|---|---|
| 2003/0211802 A1 | 11/2003 | Keck et al. |
| 2004/0030080 A1 | 2/2004 | Chang et al. |
| 2004/0055704 A1 | 3/2004 | Bunyard et al. |
| 2004/0058073 A1 | 3/2004 | Bunyard et al. |
| 2004/0058600 A1 | 3/2004 | Bunyard et al. |
| 2004/0058606 A1 | 3/2004 | Branham et al. |
| 2004/0062791 A1 | 4/2004 | Branham et al. |
| 2004/0063888 A1 | 4/2004 | Bunyard et al. |
| 2006/0068138 A1 | 3/2006 | Janssen et al. |
| 2006/0140924 A1 | 6/2006 | Schroeder et al. |
| 2006/0147505 A1 | 7/2006 | Tanzer et al. |
| 2006/0165738 A1 | 7/2006 | Schroder |
| 2007/0207113 A1 | 9/2007 | Joerger et al. |

OTHER PUBLICATIONS

American Society for Testing Materials (ASTM) Designation: D1876-01, Standard Test Method for Peel Resistance of Adhesives (T-Peel Test), pp. 1-3, published Dec. 2001.

"Sunscreen Drug Products for Over-The-Counter Human Use; Final Monograph," Federal Register, vol. 64, No. 98, May 21, 1999, pp. 27666-27693.

Patent Cooperation Treaty Search Report from the International Search Authority, International Application No. PCT/IB2010/051466 dated Jan. 21, 2011.

* cited by examiner

WET WIPES HAVING A LIQUID WIPE COMPOSITION WITH AN ORGANOPOLYSILOXANE

This application is a continuation of application Ser. No. 12/421,957 filed on Apr. 10, 2009, now U.S. Pat. No. 8,030,226. The entirety of application Ser. No. 12/421,957, now U.S. Pat. No. 8,030,226, is hereby incorporated by reference.

BACKGROUND

Nonwoven materials may be used as wet wipes. Typically, wet wipes are stacked in a container in either a folded or unfolded configuration. For example, containers of wet wipes are available wherein each of the wet wipes are arranged in a folded configuration, such as c-folded, z-folded, or quarter-folded configurations, which are well known to those skilled in the art. Sometimes the folded wet wipes are also inter-folded with the wet wipes immediately above and below in the stack of wet wipes. In yet other configurations, the wet wipes are placed in the container in the form of a continuous nonwoven material. In this case, each individual wet wipe or sheet may be connected, from the first sheet to the last, by similarly weakened lines of perforations or by adhesive bonds. These wet wipes can be stacked on top of each other in a fan folded manner or can be wound into a roll configuration.

Often, nonwoven substrates are used to produce wet wipes due to their desirable properties and low cost of manufacture. Historically, these nonwoven substrates have been non-dispersible, focusing on the strength of the nonwoven during use as an attribute. Recently, more emphasis is being placed on providing wet wipes having the ability to disperse when disposed of in the toilet bowl after use. Several municipalities have banned the disposal of non-dispersible wet wipes in municipal sewer systems. The non-dispersible wet wipes can plug typical sewage handling components such as pipes, pumps, lift stations, or screens causing operational issues for the treatment plant.

Unfortunately, when nonwoven materials have been employed as wet wipes, dispensing of the wet wipes has not been completely satisfactory. Unsatisfactory dispensing has been encountered, particularly in the case of wet wipes that are formed from adhesively-bonded nonwoven materials. Poor dispensing can be ascribed to a variety of factors, one of which is sheet-to-sheet adhesion, which is addressed herein.

Sheet-to-sheet adhesion is the tendency of a wet wipe to adhere to itself or adjacent wet wipes. Sheet-to-sheet adhesion can be attributed to a number of factors, some of which include compression of stacked or rolled wet wipes during manufacturing, attractive interactions between the nonwoven material and a liquid wipe composition, and interactions between the surfaces of adjacent, contacting nonwoven wet wipes. If the sheet-to-sheet adhesion is sufficiently high, single-handed, one-at-a-time dispensing of the wet wipes can be problematic. This problem can be particularly acute when the individual wet wipes in the stack are folded such that the leading edge of each wet wipe is folded over another portion of the wet wipe. If the leading end edge of the wet wipe has a high affinity for the wet wipe underlying it (high sheet-to-sheet adhesion), it can be undesirably difficult for the user to identify and grasp the leading end edge and peelingly lift it from the underlying stack of wet wipes. If the sheet-to-sheet adhesion is sufficiently high, tearing of the wet wipe can occur when attempting to remove the leading wet wipe from the top of the wet wipe stack.

Moreover, when the user removes an individually folded wet wipe from the underlying stack, high sheet-to-sheet adhesion can result in undesirable incomplete unfolding of the wet wipe. Additionally, high sheet-to-sheet adhesion can cause an individual folded wet wipe to remain partially adhered to the adjacent wet wipe, upon which it is resting, thus causing dispensing of multiple wet wipes rather than the preferred dispensing of an individual wet wipe. Such difficulties in separation and incomplete unfolding have undesirably resulted in reduced consumer acceptance.

This sheet-to-sheet adhesion issue has been previously addressed for various types of wet wipes. For example, non-dispersible wet wipes have been prepared with improved dispensability, wherein the leading edge of the wet wipe utilizes a repeating non-linear pattern (such as a sinusoidal pattern) to facilitate a reduced peel force for dispensing. Other non-dispersible wet wipes have also been prepared with improved dispensability wherein the coefficient of friction is reduced on the wet wipe surfaces through embossing or chemical means. Dispersible wet wipes have also been prepared that include a separate coating process with anti-blocking coatings to reduce sheet-to-sheet adhesion and facilitate a reduced peel force for dispensing.

Unfortunately, these approaches to addressing the dispensing problems caused by sheet-to-sheet adhesion are not sufficient to counteract the considerably higher sheet-to-sheet adhesion that can be observed when the wet wipe is in a stacked and/or folded configuration. Particularly, the use of an anti-blocking coating is problematic as it requires the use of an additional manufacturing step thereby increasing manufacturing complexity and cost. Additionally, changes to the physical structure of the wipes increase costs and the complexity of the process. Thus, there is a need to provide a wet wipe having a liquid wipe composition that provides reduced sheet-to-sheet adhesion without the need for additional steps in the process.

SUMMARY

The present disclosure generally relates to liquid wipe compositions and wipes. More particularly, the disclosure relates to liquid wipe compositions and wipes, the liquid wipe composition including an organopolysiloxane that reduces sheet-to-sheet adhesion, improves the stack height, increases flexibility and maintains strength in the wet wipe.

The liquid wipe composition for use in the wet wipes includes an organopolysiloxane having the following structure:

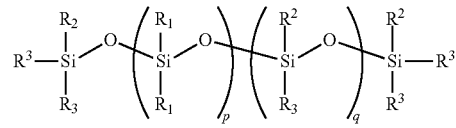

wherein p+q=0 to 2000, $R^1$ is independently selected from a monovalent hydrocarbon group or hydroxyl group, and $R^2$ and $R^3$ are independently selected from a monovalent hydrocarbon group, a hydroxyl group, a monovalent hydrocarbon group functional in amine, a monovalent hydrocarbon group functional in polyether, a monovalent hydrocarbon group functional in quaternary, and a monovalent hydrocarbon group functional in polyampholyte.

Typically, the liquid wipe composition contains from about 0.05% (by weight of the liquid wipe composition) to about 5% (by weight of the liquid wipe composition) of the organopolysiloxane. Desirably, the liquid wipe composition contains from about 0.1% (by weight of the composition) to about 2% (by weight of the composition) of the organopolysiloxane.

Furthermore, the liquid wipe composition further contains from about 75% (by weight of the liquid wipe composition) to about 99% (by weight of the liquid wipe composition) of water.

In one example, the wipe substrate is a nonwoven web prepared with a fibrous material and a binder composition to form an airlaid nonwoven web. The wet wipe in this example may have a sheet-to-sheet adhesion of less than 3 grams*force/inch (gf/in), a calculated per layer stack thickness of between about 0.4 and 0.5 mm, and a cup crush value of between 800 and 1150 g/cm$^3$.

In another example, the wipe substrate is coform. The wet wipe in this example may have a calculated per layer stack thickness of between 0.6 and 0.7 mm, and a cup crush value of between 900 and 1150 g/cm$^3$.

DETAILED DESCRIPTION

The present disclosure generally relates to liquid wipe compositions and wet wipes. More particularly, the disclosure relates to liquid wipe compositions and wet wipes, the liquid wipe composition including an organopolysiloxane that reduces sheet-to-sheet adhesion, improves the stack height, increases flexibility and maintains strength in the wet wipe.

Materials suitable for the substrate of the wipes are well know to those skilled in the art, and are typically made from a fibrous sheet material which may be either woven or nonwoven. Two types of nonwoven materials are described herein, the "nonwoven fabrics" and the "nonwoven webs". The nonwoven material may comprise either a nonwoven fabric or a nonwoven web. The nonwoven fabric may comprise a fibrous material, while the nonwoven web may comprise the fibrous material and a binder composition. In another embodiment, as used herein, the nonwoven fabric comprises a fibrous material or substrate, where the fibrous material or substrate comprises a sheet that has a structure of individual fibers or filaments randomly arranged in a mat-like fashion, and does not include the binder composition. Since nonwoven fabrics do not include a binder composition, the fibrous substrate used for forming the nonwoven fabric may desirably have a greater degree of cohesiveness and/or tensile strength than the fibrous substrate that is used for forming the nonwoven web. For this reason nonwoven fabrics comprising fibrous substrates created via hydroentangling may be particularly preferred for formation of the nonwoven fabric. Hydroentangled fibrous materials may provide the desired in-use strength properties for wet wipes that comprise a nonwoven fabric.

For example, suitable materials for use in the wipes may include nonwoven fibrous sheet materials which include meltblown, coform, airlaid, bonded-carded web materials, hydroentangled materials, and combinations thereof. Such materials can be comprised of synthetic or natural fibers, or a combination thereof. Typically, the wipes of the present disclosure define a basis weight of from about 25 grams per square meter (gsm) to about 120 gsm and desirably from about 40 gsm to about 90 gsm.

In one particular embodiment, the wipes of the present disclosure comprise a coform basesheet of polymer fibers and absorbent fibers having a basis weight of from about 45 to about 80 gsm and desirably about 60 gsm. Such coform basesheets are manufactured generally as described in U.S. Pat. Nos. 4,100,324, 5,284,703, and 5,350,624, which are incorporated by reference to the extent to they are consistent herewith. Typically, such coform basesheets comprise a gas-formed matrix of thermoplastic polymeric meltblown fibers and cellulosic fibers. Various suitable materials may be used to provide the polymeric meltblown fibers, such as, for example, polypropylene microfibers. Alternatively, the polymeric meltblown fibers may be elastomeric polymer fibers, such as those provided by a polymer resin. For instance, Vistamaxx® elastic olefin copolymer resin designated PLTD-1810, available from ExxonMobil Corporation of Houston, Tex.; or KRATON G-2755, available from Kraton Polymers of Houston, Tex. may be used to provide stretchable polymeric meltblown fibers for the coform basesheets. Other suitable polymeric materials, or combinations thereof, may alternatively be utilized as known in the art.

The coform basesheet additionally may comprise various absorbent cellulosic fibers, such as, for example, wood pulp fibers. Suitable commercially available cellulosic fibers for use in the coform basesheets can include, for example, NF 405, which is a chemically treated bleached southern softwood Kraft pulp, available from Weyerhaeuser Co. of Washington, D.C.; NB 416, which is a bleached southern softwood Kraft pulp, available from Weyerhaeuser Co.; CR-0056, which is a fully debonded softwood pulp, available from Bowater, Inc. of Greenville, S.C.; Golden Isles 4822 debonded softwood pulp, available from Koch Cellulose of Brunswick, Ga.; and SULPHATATE HJ, which is a chemically modified hardwood pulp, available from Rayonier, Inc. of Jesup, Ga.

The relative percentages of the polymeric meltblown fibers and cellulosic fibers in the coform basesheet can vary over a wide range depending upon the desired characteristics of the wipes. For example, the coform basesheet may comprise from about 10 weight percent to about 90 weight percent, desirably from about 20 weight percent to about 60 weight percent, and more desirably from about 25 weight percent to about 35 weight percent of the polymeric meltblown fibers based on the dry weight of the coform basesheet being used to provide the wipes.

In another embodiment, the wipe substrate may be an airlaid nonwoven fabric. The basis weights for airlaid nonwoven fabrics may range from about 20 to about 200 gsm with staple fibers having a denier of about 0.5-10 and a length of about 6-15 millimeters. Wet wipes may generally have a fiber density of about 0.025 g/cm$^3$ to about 0.2 g/cm$^3$. Wet wipes may generally have a basis weight of about 20 gsm to about 150 gsm. More desirably the basis weight may be from about 30 to about 90 gsm. Even more desirably the basis weight may be from about 50 gsm to about 75 gsm.

In an exemplary embodiment, the nonwoven substrate may be nonwoven web. The nonwoven web may include the fibrous material and a binder composition. With regard to the nonwoven web, the binder composition may be applied to the fibrous material or substrate to form the nonwoven web using a variety of techniques. The fibrous material used to form the nonwoven web, may desirably have a relatively low wet cohesive strength prior to its treatment with the binder composition. Thus, in the case of a dispersible nonwoven web, when the fibrous substrate is bonded together by the binder composition, the nonwoven web will preferably break apart when it is placed in tap water, such as found in toilets and sinks. Thus the identity of the fibrous material may depend on whether it is to be used to form the nonwoven fabric or the nonwoven web. Furthermore, the fibers from which the fibrous material is made may also be selected based on whether they are to be used for a nonwoven web or nonwoven fabric. The fibers forming the fibrous material may be made from a variety of materials including natural fibers, synthetic fibers, and combinations thereof. The choice of fibers may depend upon, for example, the intended end use of the finished substrate, the fiber cost and whether fibers will be used for a nonwoven fabric or a nonwoven web. For instance, suitable fibers may include, but are not limited to, natural fibers such as cotton, linen, jute, hemp, wool, wood pulp, etc. Similarly, suitable fibers may also include: regenerated cellulosic fibers, such as viscose rayon and cuprammonium rayon; modified cellulosic fibers, such as cellulose acetate; or synthetic fibers, such as those derived from polypropylenes, polyethylenes, polyolefins, polyesters, polyamides, polyacrylics, etc. Regenerated cellulose fibers, as briefly discussed above, include rayon in all its varieties as well as other fibers derived from viscose or chemically modified cellulose, including regenerated cellulose and solvent-spun cellulose, such as Lyocell®. Among wood pulp fibers, any known papermaking fibers may be used, including softwood and hardwood fibers. Fibers, for example, may be chemically pulped or mechanically pulped, bleached or unbleached, virgin or recycled, high yield or low yield, and the like. Chemically treated natural cellulosic fibers may be used, such as mercerized pulps, chemically stiffened or crosslinked fibers, or sulfonated fibers.

In addition, cellulose produced by microbes and other cellulosic derivatives may be used. As used herein, the term "cellulosic" is meant to include any material having cellulose as a major constituent, and, specifically, comprising at least 50 percent by weight cellulose or a cellulose derivative. Thus, the term includes cotton, typical wood pulps, non-woody cellulosic fibers, cellulose acetate, cellulose triacetate, rayon, thermomechanical wood pulp, chemical wood pulp, debonded chemical wood pulp, milkweed, or bacterial cellulose. Blends of one or more of any of the previously described fibers may also be used, if so desired.

The fibrous material may be formed from a single layer or multiple layers. In the case of multiple layers, the layers are generally positioned in a juxtaposed or surface-to-surface relationship and all or a portion of the layers may be bound to adjacent layers. The fibrous material may also be formed from a plurality of separate fibrous materials wherein each of the separate fibrous materials may be formed from a different type of fiber. In those instances where the fibrous material includes multiple layers, the binder composition may be applied to the entire thickness of the fibrous material, or each individual layer may be separately treated and then combined with other layers in a juxtaposed relationship to form the finished fibrous material.

As described above, the nonwoven web includes a binder composition. In one embodiment the binder composition may include a triggerable polymer. In another embodiment, the binder composition may comprise the triggerable polymer and a cobinder polymer.

The amount of binder composition present in the nonwoven web may desirably range from about 5 to about 65 percent by weight based on the total weight of the nonwoven web. More desirably, the binder composition may comprise from about 7 to about 35 percent by weight based on the total weight of the nonwoven web. Even more desirably, the binder composition may comprise from about 10 to about 25 percent by weight based on the total weight of the nonwoven web. Most desirably, the binder composition may comprise from about 15 to 20 percent by weight based on the total weight of the nonwoven web. The amount of the binder composition desirably results in a nonwoven web that has in-use integrity, but quickly disperses when soaked in tap water.

The composition of tap water can vary greatly depending on the water source. In the case of a dispersible wipe, the binder composition may preferably be capable of losing sufficient strength to allow the wet wipe to disperse in tap water covering the preponderance of the tap water composition range found throughout the United States (and throughout the world). Thus, it is important to evaluate the dispersibility of the binder composition in aqueous solutions which contain the major components in tap water and in a representative concentration range encompassing the majority of the tap water sources in the United States. The predominant inorganic ions typically found in drinking water are sodium, calcium, magnesium, bicarbonate, sulfate and chloride. Based on a recent study conducted by the American Water Works Association (AWWA) in 1996, the predominance of the U.S. municipal water systems (both ground water and surface water sources) surveyed have a total dissolved solids of inorganic components of about 500 ppm or less. This level of 500 ppm total dissolved solids also represents the secondary drinking water standard set by the U.S. Environmental Protection Agency. The average water hardness, which represents the calcium and magnesium concentrations in the tap water source, at this total dissolved solids level was approximately 250 ppm ($CaCO_3$ equivalent), which also encompasses the water hardness for the predominance of the municipal water systems surveyed by the AWWA. As defined by the United States Geological Survey (USGS), a water hardness of 250 ppm $CaCO_3$ equivalent would be considered "very hard" water. Similarly, the average bicarbonate concentration at 500 ppm total dissolved solids reported in the study was ca. 12 ppm, which also encompasses the bicarbonate, or alkalinity, of the predominance of the municipal water systems surveyed. A past study by the USGS of the finished water supplies of 100 of the largest cities in the United States suggests that a sulfate level of about 100 ppm is sufficient to cover the majority of finished water supplies. Similarly, sodium and chloride levels of at least 50 ppm each should be sufficient to cover the majority of U.S. finished water supplies. Thus, binder compositions which are capable of losing strength in tap water compositions meeting these minimum requirements should also lose strength in tap water compositions of lower total dissolved solids with varied compositions of calcium, magnesium, bicarbonate, sulfate, sodium, and chloride. To ensure the dispersibility of the binder composition across the country (and throughout the whole world), the binder composition may desirably be soluble in water containing up to about 100 ppm total dissolved solids and a $CaCO_3$ equivalent hardness up to about 55 ppm. More desirably, the binder composition may be soluble in water containing up to about 300 ppm of total dissolved solids and a $CaCO_3$ equivalent hardness up to about 150 ppm. Even more desirably, the binder composition may be soluble in water containing up to about 500 ppm total dissolved solids and a $CaCO_3$ equivalent hardness up to about 250 ppm.

As previously discussed, the binder composition may comprise the triggerable polymer and a cobinder. A variety of triggerable polymers may be used. One type of triggerable polymer is a dilution triggerable polymer. Examples of dilution triggerable polymers include ion-sensitive polymers, which may be employed in combination with a liquid wipe composition in which the insolubilizing agent is a salt. Other dilution triggerable polymers may also be employed, wherein these dilution triggerable polymers are used in combination with wetting agents using a variety of insolubilizing agents, such as organic or polymeric compounds.

Although the triggerable polymer may be selected from a variety of polymers, including temperature sensitive polymers and pH-sensitive polymers, the triggerable polymer may preferably be the dilution triggerable polymer, comprising the ion-sensitive polymer. If the ion-sensitive polymer is derived from one or more monomers, where at least one contains an anionic functionality, the ion-sensitive polymer is referred to as an anionic ion-sensitive polymer. If the ion-sensitive polymer is derived from one or more monomers, where at least one contains a cationic functionality, the ion-sensitive polymer is referred to as a cationic ion-sensitive polymer. An exemplary anionic ion-sensitive polymer is described in U.S. Pat. No. 6,423,804, which is incorporated herein in its entirety by reference.

Examples of cationic ion-sensitive polymers are disclosed in the following U.S. Patent Application Publication Nos.: 2003/0026963, 2003/0027270, 2003/0032352, 2004/0030080, 2003/0055146, 2003/0022568, 2003/0045645, 2004/0058600, 2004/0058073, 2004/0063888, 2004/0055704, 2004/0058606, and 2004/0062791, all of which are incorporated herein by reference in their entirety, except that in the event of any inconsistent disclosure or definition from the present application, the disclosure or definition herein shall be deemed to prevail.

Desirably, the ion-sensitive polymer may be insoluble in the liquid wipe composition, wherein the liquid wipe composition comprises at least about 0.3 weight percent of an insolubilizing agent which may be comprised of one or more inorganic and/or organic salts containing monovalent and/or divalent ions. More desirably, the ion-sensitive polymer may be insoluble in the liquid wipe composition, wherein the liquid wipe composition comprises from about 0.3% to about 10% by weight of an insolubilizing agent which may be comprised of one or more inorganic and/or organic salts containing monovalent and/or divalent ions. Even more desirably, the ion-sensitive polymer may be insoluble in the liquid wipe composition, wherein the liquid wipe composition comprises from about 0.5% to about 5% by weight of an insolubilizing agent which comprises one or more inorganic and/or organic salts containing monovalent and/or divalent ions. Especially desirably, the ion-sensitive polymer may be insoluble in the liquid wipe composition, wherein the liquid wipe composition comprises from about 1% to about 4% by weight of an insolubilizing agent which comprises one or more inorganic and/or organic salts containing monovalent and/or divalent ions. Suitable monovalent ions include, but are not limited to, $Na^+$ ions, $K^+$ ions, $Li^+$ ions, $NH_4^+$ ions, low molecular weight quaternary ammonium compounds (e.g., those having fewer than 5 carbons on any side group), and a combination thereof. Suitable divalent ions include, but are not limited to, $Zn^{2+}$, $Ca^{2+}$ and $Mg^{2+}$. These monovalent and divalent ions may be derived from organic and inorganic salts including, but not limited to, NaCl, NaBr, KCl, $NH_4Cl$, $Na_2SO_4$, $ZnCl_2$, $CaCl_2$, $MgCl_2$, $MgSO_4$, and combinations thereof. Typically, alkali metal halides are the most desirable monovalent or divalent ions because of cost, purity, low toxicity and availability. A desirable salt is NaCl.

In a preferred embodiment, the ion-sensitive polymer may desirably provide the nonwoven web with sufficient in-use strength (typically >300 gf/in) in combination with the liquid wipe composition containing sodium chloride. These nonwoven webs may be dispersible in tap water, desirably losing most of their wet strength (<100 gf/in) in 24 hours or less.

In another preferred embodiment, the ion-sensitive polymer may comprise the cationic sensitive polymer, wherein the cationic sensitive polymer is a cationic polyacrylate that is the polymerization product of 96 mol % methyl acrylate and 4 mol % [2-(acryloyloxy)ethyl]trimethyl ammonium chloride.

As previously discussed, the binder composition may comprise the triggerable polymer and/or the cobinder. When the binder composition comprises the triggerable polymer and the cobinder, the triggerable polymer and the cobinder may preferably be compatible with each other in aqueous solutions to: 1) allow for facile application of the binder composition to the fibrous substrate in a continuous process and 2) prevent interference with the dispersibility of the binder composition. Therefore, if the triggerable polymer is the anionic ion-sensitive polymer, cobinders which are anionic, nonionic, or very weakly cationic may be preferred. If the triggerable polymer is the cationic ion-sensitive polymer, cobinders which are cationic, nonionic, or very weakly anionic may be added. Additionally, the cobinder desirably does not provide substantial cohesion to the nonwoven material by way of covalent bonds, such that it interferes with the dispersibility of the nonwoven web.

The presence of the cobinder may provide a number of desirable qualities. For example, the cobinder may serve to reduce the shear viscosity of the triggerable polymer, such that the binder composition has improved sprayability over the triggerable binder alone. By use of the term "sprayable" it is meant that these polymers may be applied to the fibrous material or substrate by spraying, allowing the uniform distribution of these polymers across the surface of the substrate and penetration of these polymers into the substrate. The cobinder may also reduce the stiffness of the nonwoven web compared to the stiffness of a nonwoven web to which only the triggerable polymer has been applied. Reduced stiffness may be achieved if the cobinder has a glass transition temperature, $T_g$, which is lower than the $T_g$ of the triggerable polymer. In addition, the cobinder may be less expensive than the triggerable polymer and by reducing the amount of triggerable polymer needed, may serve to reduce the cost of the binder composition. Thus, it may be desirable to use the highest amount of cobinder possible in the binder composition such that it does not jeopardize the dispersibility and in-use strength properties of the wet wipe. In a preferred embodiment, the cobinder replaces a portion of the triggerable polymer in the binder composition and permits a given strength level to be achieved, relative to a wet wipe having approximately the same tensile strength but containing only the triggerable polymer in the binder composition, to provide at least one of the following attributes: lower stiffness, better tactile properties (e.g. lubricity or smoothness) or reduced cost.

In one embodiment, the cobinder present in the binder composition, relative to the mass of the binder composition, may be about 10% or less, more desirably about 15% or less, more desirably 20% or less, more desirably 30% or less, or more desirably about 45% or less. Exemplary ranges of cobinder relative to the solid mass of the binder composition may include from about 1% to about 45%, from about 25% to about 35%, from about 1% to about 20% and from about 5% to about 25%.

The cobinder may be selected from a wide variety of polymers, as are known in the art. For example, the cobinder may be selected from the group consisting of poly(ethylene-vinyl acetate), poly(styrene-butadiene), poly(styrene-acrylic), a vinyl acrylic terpolymer, a polyester latex, an acrylic emulsion latex, poly(vinyl chloride), ethylene-vinyl chloride copolymer, a carboxylated vinyl acetate latex, and the like. A variety of additional exemplary cobinder polymers are discussed in U.S. Pat. No. 6,653,406 and U.S. Patent Application Publication No. 2003/00326963, which are both incorporated herein by reference in their entirety. Particularly preferred cobinders include Airflex® EZ123 and Airflex® 110.

To prepare the nonwoven webs described herein, the binder composition may be applied to the fibrous material by any known process. Suitable processes for applying the binder composition include, but are not limited to printing, spraying, electrostatic spraying, the use of metered press rolls or impregnating. The amount of binder composition may be metered and distributed uniformly onto the fibrous material or may be non-uniformly distributed onto the fibrous material.

Once the binder composition is applied to the fibrous material, drying, if necessary, may be achieved by any conventional means. Once dry, the nonwoven material may exhibit improved tensile strength when compared to the tensile strength of the untreated wet-laid or dry-laid fibrous material, and yet should have the ability to rapidly "fall apart" or disintegrate when placed in tap water.

A number of techniques may be employed to manufacture the wet wipes. In one embodiment, these techniques may include the following steps:
1. Providing the fibrous material (e.g., an unbonded airlaid, a tissue web, a carded web, fluff pulp, etc.).
2. Applying the binder composition to the fibrous material, typically in the form of a liquid, suspension, or foam to provide the nonwoven web.
3. The nonwoven web may be dried.
4. Applying a wetting composition to the nonwoven web to generate the wet wipe.
5. Placing the wet wipe in roll form or in a stack and packaging the product.

In one embodiment, Step 2 as discussed above, may be carried out such that the triggerable polymer of the binder composition are applied as a mixture to the fibrous material, referred to as mixture application.

In one embodiment, the binder composition as applied in step 2 may comprise the triggerable polymer. In a further embodiment, the binder composition as applied in step 2 may comprise the triggerable polymer and the cobinder.

The finished wet wipes may be individually packaged, desirably in a folded condition, in a moisture proof envelope or packaged in containers holding any desired number of sheets in a water-tight package with a wetting composition applied to the wipe. Some example processes which can be used to manufacture folded wet wipes are described in U.S. Pat. Nos. 5,540,332 and 6,905,748, which are incorporated by reference herein. The finished wipes may also be packaged as a roll of separable sheets in a moisture-proof container holding any desired number of sheets on the roll with a wetting composition applied to the wipes. The roll can be coreless and either hollow or solid. Coreless rolls, including rolls with a hollow center or without a solid center, can be produced with known coreless roll winders, including those of SRP Industry, Inc. of San Jose, Calif.; Shimizu Manufacturing of Japan, and the devices disclosed in U.S. Pat. No. 4,667,890. U.S. Pat. No. 6,651,924 also provides examples of a process for producing coreless rolls of wet wipes.

In addition to the wipe substrate, wet wipes also contain a liquid wipe composition described herein. The liquid wet wipe composition can be any liquid, which can be absorbed into the wet wipe basesheet and may include any suitable components, which provide the desired wiping properties. For example, the components may include water, emollients, surfactants, fragrances, preservatives, organic or inorganic acids, chelating agents, pH buffers, or combinations thereof, as are well known to those skilled in the art. Further, the liquid may also contain lotions, medicaments, and/or antimicrobials.

To reduce sheet-to-sheet adhesion, improve the stack height, increase flexibility and maintain strength in the wet wipe, the liquid wipe composition includes an organopolysiloxane. The particular structure of the organopolysiloxane may provide the desired product properties to the basesheet.

Polysiloxanes encompass a very broad class of compounds. They are characterized in having a general backbone structure:

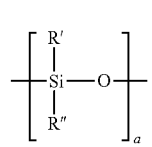

Wherein R' and R" may be a broad range of organo and non-organo groups including mixtures of such groups and where a is an integer $\geq 2$. These polysiloxanes may be linear or branched. They may include a wide variety of polysiloxane copolymers containing various compositions of functional groups. Hence, R' and R" actually may represent many different types of groups within the same polymer molecule. The scope of the present invention should not be construed as limited by a particular polysiloxane structure so long as that polysiloxane structure delivers the aforementioned product benefits to the basesheet and/or final tissue product.

In addition to the general backbone structure, functionalization of the polysiloxane can occur in the main chain of the polymer (side-chain functional polysiloxanes), at the chain ends (end-chain functional polysiloxanes), or both (fully functional polysiloxanes). A more general structure for the functionalized polysiloxane includes both the side-chain and the end-chain structural variation:

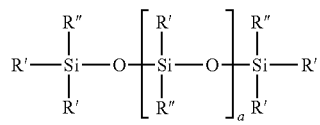

Desirably, the polysiloxanes is an organopolysiloxanes. Especially preferred are polyether organopolysiloxanes and amino-functional organopolysiloxanes, or mixed amino-polyether polysiloxanes. Linear or branched organopolysiloxanes are within the scope of the present invention. Linear end-chain functionalized organopolysiloxanes are preferred. Most preferred polysiloxanes are linear end-chain functionalized organofunctional polysiloxanes with a level of organofunctionality sufficient to provide distribution within an aqueous medium, but insufficient to compromise the performance derived from the general non-organopolysiloxane portion of the polymer. Amino-functional organopolysiloxanes are derived to include fully substituted amine functional organopolysiloxanes, as well as quaternary amine and amphoteric functional organopolysiloxanes.

The inventors have discovered that not all polysiloxanes provide the desired performance attributes of the present invention. Without being limited by any particular theory, it is believed that a critical level of "non-organo polysiloxane" is required in the organopolysiloxane composition. If there is insufficient polysiloxane character to the polymeric composition, desired reduction in sheet to sheet adhesion is not realized. Preferred specific examples of organopolysiloxanes include those represented by the following structure:

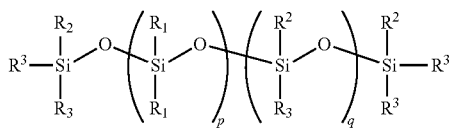

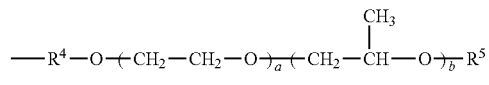

wherein p+q=0 to 2000; $R^1$ independently represents a monovalent hydrocarbon group or hydroxyl group; $R^2$ independently represents a monovalent hydrocarbon group or hydroxyl group, or independently represents a monovalent hydrocarbon group functional in amine, polyether, quaternary or polyampholyte; and $R^3$ independently represents a monovalent hydrocarbon group or hydroxyl group, or independently represents a monovalent hydrocarbon group functional in amine, polyether, quaternary or polyampholyte.

It should be noted that there is some variability in the designation of the terminus of the polymer chains. Where sidechain substitution of the polysiloxane is predominant, the polymer terminus units may be comprised of —Si$(R^2)_3$ radicals. For strictly end-chain substituted polymers, the polymer terminus units may be comprised of —Si$(R^3)_2R^2$ radicals and q would have a value of zero. Additional structural features and examples of the polymers for use as the organopolysiloxane will be illustrated as each class of functional groups is described.

It should be pointed out that for the preferred polysiloxane compositions, some level of solubility or dispersibility of the polysiloxane in water is desired. It should also be pointed out that the organopolysiloxane functionality included in the polysiloxane is the radical of the polymer that imparts water solubility. In addition, the level of substitution, the length of the organo-substitution, and the location of the organo-substitution all influence the ultimate solubility or dispersibility of the polysiloxane in water.

Since there is so much potential variability in structure possible to describe the polymers of the present invention, it is not possible to address all compositions of the present invention with a single general composition of specified substitution ranges. It is therefore necessary to describe the general structural features of the preferred organopolysiloxane polymers, and further specify that the average level of substitution and length of substitution must combine to impart the desired solubility or dispersibility characteristics that deliver the aforementioned product improvements to the basesheet.

Examples of monovalent hydrocarbon groups as $R^1$ include alkyl, aryl, and alkoxy groups. As $R^1$, $C_{1-3}$ alkyl groups (particularly methyl group) and $C_{1-15}$ alkoxy groups are preferred. Further examples of $R^1$ radicals include —OCH$_3$, —OCH$_2$CH$_3$, —OH.

Examples of monovalent hydrocarbon groups as $R^2$ and $R^3$ include alkyl, aryl, and alkoxy groups. As $R^2$ and $R^3$, $C_{1-3}$ alkyl groups (particularly methyl group) and $C_{1-15}$ alkoxy groups are preferred. Further examples of $R^2$ and $R^3$ radicals include, —OCH$_3$, —OCH$_2$CH$_3$, —OH.

In addition, $R^2$ and $R^3$ can independently represent a hydrocarbon group selected from the group that is functional in amine, polyether, quaternary and/or polyampholyte. These structures will be further described separately.

$R^2$ and $R^3$ can independently represent a monovalent organic group containing at least one polyether radical. Examples of monovalent organic group containing polyether radicals as $R^3$ include:

wherein $R^4$ is a divalent hydrocarbon group of 1 to 6 carbon atoms; $R^5$ is a monovalent hydrocarbon group of 1 to 10 carbon atoms or hydrogen; the ratio of a to b is from 0 to 1; and a+b=from 2 to 20.

$R^2$ and $R^3$ can also represent a monovalent organic group containing at least one amine radical. In addition the amine functional $R^3$ can be further functional with additional polyether functionality. Examples of monovalent organic group containing amine and amine/polyether radicals as $R^3$ include:

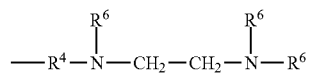

wherein $R^4$ is a divalent hydrocarbon group of 1 to 6 carbon atoms; $R^6$ is either hydrogen, or a monovalent polyether functional hydrocarbon radical, exemplified here:

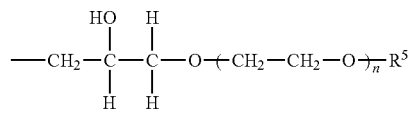

wherein $R^5$ is a monovalent hydrocarbon group of 1 to 10 carbon atoms or hydrogen.

Other structures for $R^2$ and $R^3$ incorporating amine and amine/polyether functionality into the polysiloxane may also be included.

$R^2$ and $R^3$ can independently represent a monovalent organic group containing at least one quaternary amine radical. An exemplary monovalent organic group containing quaternary amine radicals as $R^3$ includes:

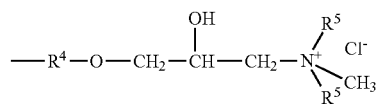

wherein $R^4$ is a divalent hydrocarbon group of 1 to 6 carbon atoms; and $R^5$ is a monovalent hydrocarbon group of 1 to 10 carbon atoms or hydrogen.

Other structures for $R^2$ and $R^3$ incorporating quaternary amine functionality into the polysiloxane may also be included.

$R^2$ and $R^3$ can be functional in polyampholyte and independently represent a monovalent organic group containing at least one amphoteric radical. Examples of monovalent organic group containing amphoteric radicals as $R^3$ include:

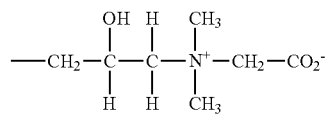

Examples of organopolysiloxane compositions that provide the improved sheet adhesion reduction in wet wipes include KF-889®, a silicone manufactured by Shin-etsu Silicones of America, Inc. of Akron, Ohio. This compound is fully described and provided herein for reference in U.S. Pat. No. 6,515,095. Another example of a preferred organopolysiloxane is Abil®Quat 3274, available from Evonik Industries of Germany. Yet another preferred organopolysiloxane is Dow Corning® 8600, available from Dow Corning of Midland, Mich. All of these silicones have been found to provide desirable reduction in sheet to sheet adhesion, without compromise of other critical performance parameters of the wet wipe product. Furthermore, the presence of the organopolysiloxane imparts improved flexibility and an increase to the calculated per layer stack thickness.

Typically, the liquid wipe composition contains from about 0.05% (by weight of the liquid wipe composition) to about 5% (by weight of the liquid wipe composition) of the organopolysiloxane. Desirably, the liquid wipe composition contains from about 0.1% (by weight of the composition) to about 2% (by weight of the composition) of the organopolysiloxane.

The liquid wipe composition may desirably be incorporated into the wipe in an add-on amount of from about 10% (by weight of the substrate) to about 600% (by weight of the substrate), more desirably from about 50% (by weight of the substrate) to about 500% (by weight of the substrate), even more desirably from about 100% (by weight of the substrate) to about 500% (by weight of the substrate), and especially more desirably from about 200% (by weight of the substrate) to 300% (by weight of the substrate).

The desired liquid wipe composition add-on amounts may vary depending on the composition of the wipe substrate. Typically, however, for coform basesheets, the wet wipe composition add-on amount will be from about 250% (by weight of the substrate) to about 350% (by weight of the substrate), and more typically about 330% (by weight of the substrate). For airlaid basesheets, the composition add-on amount will typically be from about 130% (by weight of the substrate) to about 300% (by weight of the substrate), and more typically will be about 235% (by weight of the substrate).

In the case of a dispersible, wipe, the liquid wipe composition for use in combination with the nonwoven materials may desirably comprise an aqueous composition containing the insolubilizing agent that maintains the coherency of the binder composition and thus the in-use strength of the wet wipe until the insolubilizing agent is diluted with tap water. Thus the liquid wipe composition may contribute to the triggerable property of the triggerable polymer and concomitantly the binder composition.

The insolubilizing agent in the liquid wipe composition can be a salt, such as those previously disclosed for use with the ion-sensitive polymer, a blend of salts having both monovalent and multivalent ions, or any other compound, which provides in-use and storage strength to the binder composition and may be diluted in water to permit dispersion of the wet wipe as the binder composition transitions to a weaker state. The liquid wipe composition may desirably contain more than about 0.3 weight percent of an insolubilizing agent based on the total weight of the liquid wipe composition. The liquid wipe composition may desirably contain from about 0.3 weight percent to about 10 weight percent of an insolubilizing agent based on the total weight of the liquid wipe composition. More desirably, the liquid wipe composition may contain from about 0.5 weight percent to about 5 weight percent of an insolubilizing agent based on the total weight of the liquid wipe composition. More desirably, the liquid wipe composition may contain from about 1 weight percent to about 4 weight percent of an insolubilizing agent based on the total weight of the liquid wipe composition. Even more desirably, the liquid wipe composition may contain from about 1 weight percent to about 2 weight percent of an insolubilizing agent based on the total weight of the liquid wipe composition.

The liquid wipe composition may desirably be compatible with the triggerable polymer, the cobinder polymer, and any other components of the binder composition. In addition, the liquid wipe composition desirably contributes to the ability of the wet wipes to maintain coherency during use, storage and/or dispensing, while still providing dispersibility in tap water.

In one example, the liquid wipe compositions may contain water. The liquid wipe compositions can suitably contain water in an amount of from about 0.1% (by weight of the composition) to about 99.9% (by weight of the composition), more typically from about 40% (by weight of the composition) to about 99% (by weight of the composition), and more preferably from about 60% (by weight of the composition) to about 99.9% (by weight of the composition). For instance, where the composition is used in connection with a wet wipe, the composition can suitably contain water in an amount of from about 75% (by weight of the composition) to about 99.9% (by weight of the composition).

The liquid wipe compositions may further contain additional agents that impart a beneficial effect on skin or hair and/or further act to improve the aesthetic feel of the compositions and wipes described herein. Examples of suitable skin benefit agents include emollients, sterols or sterol derivatives, natural and synthetic fats or oils, viscosity enhancers, rheology modifiers, polyols, surfactants, alcohols, esters, silicones, clays, starch, cellulose, particulates, moisturizers, film formers, slip modifiers, surface modifiers, skin protectants, humectants, sunscreens, and the like.

Thus, in one example, the liquid wipe compositions may further optionally include one or more emollients, which typically acts to soften, soothe, and otherwise lubricate and/or moisturize the skin. Suitable emollients that can be incorporated into the compositions include oils such as petrolatum based oils, petrolatum, mineral oils, alkyl dimethicones, alkyl methicones, alkyldimethicone copolyols, phenyl silicones, alkyl trimethylsilanes, dimethicone, dimethicone crosspolymers, cyclomethicone, lanolin and its derivatives, glycerol esters and derivatives, propylene glycol esters and derivatives, alkoxylated carboxylic acids, alkoxylated alcohols, and combinations thereof.

Ethers such as eucalyptol, cetearyl glucoside, dimethyl isosorbic polyglyceryl-3 cetyl ether, polyglyceryl-3 decyltetradecanol, propylene glycol myristyl ether, and combinations thereof, can also suitably be used as emollients.

In addition, the liquid wipe composition may include an emollient in an amount of from about 0.01% (by weight of the composition) to about 20% (by weight of the composition), more desirably from about 0.05% (by weight of the composition) to about 10% (by weight of the composition), and more typically from about 0.1% (by weight of the composition) to about 5% (by weight of the composition).

One or more viscosity enhancers may also be added to the liquid wipe composition to increase the viscosity, to help stabilize the composition thereby reducing migration of the composition and improving transfer to the skin. Suitable viscosity enhancers include polyolefin resins, lipophilic/oil thickeners, polyethylene, silica, silica silylate, silica methyl silylate, colloidal silicone dioxide, cetyl hydroxy ethyl cellulose, other organically modified celluloses, PVP/decane copolymer, PVM/MA decadiene crosspolymer, PVP/eicosene copolymer, PVP/hexadecane copolymer, clays, starches, gums, water-soluble acrylates, carbomers, acrylate based thickeners, surfactant thickeners, and combinations thereof.

The liquid wipe composition may desirably include one or more viscosity enhancers in an amount of from about 0.01% (by weight of the composition) to about 25% (by weight of the composition), more desirably from about 0.05% (by weight of the composition) to about 10% (by weight of the composition), and even more desirably from about 0.1% (by weight of the composition) to about 5% (by weight of the composition).

The compositions of the disclosure may optionally further contain humectants. Examples of suitable humectants include glycerin, glycerin derivatives, sodium hyaluronate, betaine, amino acids, glycosaminoglycans, honey, sorbitol, glycols, polyols, sugars, hydrogenated starch hydrolysates, salts of PCA, lactic acid, lactates, and urea. A particularly preferred humectant is glycerin. The composition of the present disclosure may suitably include one or more humectants in an amount of from about 0.05% (by weight of the composition) to about 25% (by weight of the composition).

The compositions of the disclosure may optionally further contain film formers. Examples of suitable film formers include lanolin derivatives (e.g., acetylated lanolins), superfatted oils, cyclomethicone, cyclopentasiloxane, dimethicone, synthetic and biological polymers, proteins, quaternary ammonium materials, starches, gums, cellulosics, polysaccharides, albumen, acrylates derivatives, IPDI derivatives, and the like. The composition of the present disclosure may suitably include one or more film formers in an amount of from about 0.01% (by weight of the composition) to about 20% (by weight of the composition).

The liquid wipe compositions may also further contain skin protectants. Examples of suitable skin protectants include ingredients referenced in SP monograph (21 CFR §347). Suitable skin protectants and amounts include those set forth in SP monograph, Subpart B—Active Ingredients §347.10: (a) Allantoin, 0.5 to 2%, (b) Aluminum hydroxide gel, 0.15 to 5%, (c) Calamine, 1 to 25%, (d) Cocoa butter, 50 to 100%, (e) Cod liver oil, 5 to 13.56%, in accordance with §347.20(a)(1) or (a)(2), provided the product is labeled so that the quantity used in a 24-hour period does not exceed 10,000 U.S.P. Units vitamin A and 400 U.S.P. Units cholecalciferol, (f) Colloidal oatmeal, 0.007% minimum; 0.003% minimum in combination with mineral oil in accordance with §347.20 (a)(4), (g) Dimethicone, 1 to 30%, (h) Glycerin, 20 to 45%, (i) Hard fat, 50 to 100%, (j) Kaolin, 4 to 20%, (k) Lanolin, 12.5 to 50%, (l) Mineral oil, 50 to 100%; 30 to 35% in combination with colloidal oatmeal in accordance with §347.20(a)(4), (m) Petrolatum, 30 to 100%, (o) Sodium bicarbonate, (q) Topical starch, 10 to 98%, (r) White petrolatum, 30 to 100%, (s) Zinc acetate, 0.1 to 2%, (t) Zinc carbonate, 0.2 to 2%, (u) Zinc oxide, 1 to 25%.

The liquid wipe compositions may also further contain sunscreens. Examples of suitable sunscreens include aminobenzoic acid, avobenzone, cinoxate, dioxybenzone, homosalate, menthyl anthranilate, octocrylene, octinoxate, octisalate, oxybenzone, padimate 0, phenylbenzimidazole sulfonic acid, sulisobenzone, titanium dioxide, trolamine salicylate, zinc oxide, and combinations thereof. Other suitable sunscreens and amounts include those approved by the FDA, as described in the Final Over-the-Counter Drug Products Monograph on Sunscreens (Federal Register, 1999:64: 27666-27693), herein incorporated by reference, as well as European Union approved sunscreens and amounts.

The liquid wipe compositions may also further contain quaternary ammonium materials. Examples of suitable quaternary ammonium materials include polyquaternium-7, polyquaternium-10, benzalkonium chloride, behentrimonium methosulfate, cetrimonium chloride, cocamidopropyl pg-dimonium chloride, guar hydroxypropyltrimonium chloride, isostearamidopropyl morpholine lactate, polyquaternium-33, polyquaternium-60, polyquaternium-79, quaternium-18 hectorite, quaternium-79 hydrolyzed silk, quaternium-79 hydrolyzed soy protein, rapeseed amidopropyl ethyldimonium ethosulfate, silicone quaternium-7, stearalkonium chloride, palmitamidopropyltrimonium chloride, butylglucosides, hydroxypropyltrimonium chloride, laurdimoniumhydroxypropyl decylglucosides chloride, and the like. The composition of the present disclosure may suitably include one or more quaternary materials in an amount of from about 0.01% (by weight of the composition) to about 20% (by weight of the composition).

The liquid wipe compositions may optionally further contain surfactants. Examples of suitable additional surfactants include, for example, anionic surfactants, cationic surfactants, amphoteric surfactants, zwitterionic surfactants, nonionic surfactants, and combinations thereof. Specific examples of suitable surfactants are known in the art and include those suitable for incorporation into liquid wipe compositions and wipes. The composition of the present disclosure may suitably include one or more surfactants in an amount of from about 0.01% (by weight of the composition) to about 20% (by weight of the composition).

In addition to nonionic surfactants, the cleanser may also contain other types of surfactants. For instance, in some embodiments, amphoteric surfactants, such as zwitterionic surfactants, may also be used. For instance, one class of amphoteric surfactants that may be used in the present disclosure are derivatives of secondary and tertiary amines having aliphatic radicals that are straight chain or branched, wherein one of the aliphatic substituents contains from about 8 to 18 carbon atoms and at least one of the aliphatic substituents contains an anionic water-solubilizing group, such as a carboxy, sulfonate, or sulfate group. Some examples of amphoteric surfactants include, but are not limited to, sodium 3-(dodecylamino)propionate, sodium 3-(dodecylamino)-propane-1-sulfonate, sodium 2-(dodecylamino)ethyl sulfate, sodium 2-(dimethylamino)octadecanoate, disodium 3-(N-carboxymethyl-dodecylamino)propane-1-sulfonate, disodium octadecyliminodiacetate, sodium 1-carboxymethyl-2-undecylimidazole, and sodium N,N-bis(2-hydroxyethyl)-2-sulfato-3-dodecoxypropylamine.

Additional classes of suitable amphoteric surfactants include phosphobetaines and the phosphitaines. For instance, some examples of such amphoteric surfactants include, but are not limited to, sodium coconut N-methyl taurate, sodium oleyl N-methyl taurate, sodium tall oil acid N-methyl taurate, sodium palmitoyl N-methyl taurate, cocodimethylcarboxymethylbetaine, lauryldimethylcarboxymethylbetaine, lauryldimethylcarboxyethylbetaine, cetyldimethylcarboxymethylbetaine, lauryl-bis-(2-hydroxyethyl) carboxymethylbetaine, oleyldimethylgammacarboxypropylbetaine, lauryl-bis-(2-hydroxypropyl)-carboxyethylbetaine, cocoamidodimethylpropylsultaine, stearylamidodimethylpropylsultaine, laurylamido-bis-(2-hydroxyethyl)propylsultaine, di-sodium oleamide PEG-2 sulfosuccinate, TEA oleamido PEG-2 sulfosuccinate, disodium oleamide MEA sulfosuccinate, disodium oleamide MIPA sulfosuccinate, disodium ricinoleamide MEA sulfosuccinate, disodium undecylenamide MEA sulfosuccinate, disodium lauryl sulfosuccinate, disodium wheat germamido MEA sulfosuccinate, disodium wheat germamido PEG-2 sulfosuccinate, disodium isostearamideo MEA sulfosuccinate, cocoamphoglycinate, cocoamphocarboxyglycinate, lauroamphoglycinate, lauroamphocarboxyglycinate, capryloamphocarboxyglycinate, cocoamphopropionate, cocoamphocarboxypropionate, lauroamphocarboxypropionate, capryloamphocarboxypropionate, dihydroxyethyl tallow glycinate, cocoamido disodium 3-hydroxypropyl phosphobetaine, lauric myristic amido disodium 3-hydroxypropyl phosphobetaine, lauric myristic amido glyceryl phosphobetaine, lauric myristic amido carboxy disodium 3-hydroxypropyl phosphobetaine, cocoamido propyl monosodium phosphitaine, cocamidopropyl betaine, lauric myristic amido propyl monosodium phosphitaine, and mixtures thereof.

In certain instances, it may also be desired to utilize one or more anionic surfactants within the cleansers. Suitable anionic surfactants include, but are not limited to, alkyl sulfates, alkyl ether sulfates, alkyl ether sulfonates, sulfate esters of an alkylphenoxy polyoxyethylene ethanol, alpha-olefin sulfonates, beta-alkoxy alkane sulfonates, alkyllauryl sulfonates, alkyl monoglyceride sulfates, alkyl monoglyceride sulfonates, alkyl carbonates, alkyl ether carboxylates, fatty acid salts, sulfosuccinates, sarcosinates, octoxynol or nonoxynol phosphates, taurates, fatty taurides, fatty acid amide polyoxyethylene sulfates, isethionates, or mixtures thereof.

Particular examples of some suitable anionic surfactants include, but are not limited to, $C_{8-18}$ alkyl sulfates, $C_{8-18}$ fatty acid salts, $C_{8-18}$ alkyl ether sulfates having one or two moles of ethoxylation, $C_{8-18}$ alkoyl sarcosinates, $C_{8-18}$ sulfoacetates, $C_{8-18}$ sulfosuccinates, $C_{8-18}$ alkyl diphenyl oxide disulfonates, $C_{8-18}$ alkyl carbonates, $C_{8-18}$ alpha-olefin sulfonates, methyl ester sulfonates, and blends thereof. The $C_{8-18}$ alkyl group can be straight chain (e.g., lauryl) or branched (e.g., 2-ethylhexyl). The cation of the anionic surfactant can be an alkali metal (e.g., sodium or potassium), ammonium, $C_{1-4}$ alkylammonium (e.g., mono-, di-, tri-), or $C_{1-3}$ alkanolammonium (e.g., mono-, di-, tri-).

Specific examples of such anionic surfactants include, but are not limited to, lauryl sulfates, octyl sulfates, 2-ethylhexyl sulfates, decyl sulfates, tridecyl sulfates, cocoates, lauroyl sarcosinates, lauryl sulfosuccinates, linear $C_{10}$ diphenyl oxide disulfonates, lauryl sulfosuccinates, lauryl ether sulfates (1 and 2 moles ethylene oxide), myristyl sulfates, oleates, stearates, tallates, ricinoleates, cetyl sulfates, and similar surfactants.

Cationic surfactants, such as cetylpyridinium chloride and methylbenzethonium chloride, may also be utilized.

The liquid wipe compositions may also further contain additional emulsifiers. As mentioned above, the natural fatty acids, esters and alcohols and their derivatives, and combinations thereof, may act as emulsifiers in the composition. Optionally, the composition may contain an additional emulsifier other than the natural fatty acids, esters and alcohols and their derivatives, and combinations thereof. Examples of suitable emulsifiers include nonionic emulsifiers such as polysorbate 20, polysorbate 80, anionic emulsifiers such as DEA phosphate, cationic emulsifiers such as behentrimonium methosulfate, and the like. The composition of the present disclosure may suitably include one or more additional emulsifier in an amount of from about 0.01% (by weight of the composition) to about 10% (by weight of the composition).

For example, nonionic surfactants may be used as an emulsifier. Nonionic surfactants typically have a hydrophobic base, such as a long chain alkyl group or an alkylated aryl group, and a hydrophilic chain comprising a certain number (e.g., 1 to about 30) of ethoxy and/or propoxy moieties. Examples of some classes of nonionic surfactants that can be used include, but are not limited to, ethoxylated alkylphenols, ethoxylated and propoxylated fatty alcohols, polyethylene glycol ethers of methyl glucose, polyethylene glycol ethers of sorbitol, ethylene oxide-propylene oxide block copolymers, ethoxylated esters of fatty ($C_{8-18}$) acids, condensation products of ethylene oxide with long chain amines or amides, condensation products of ethylene oxide with alcohols, and mixtures thereof.

Various specific examples of suitable nonionic surfactants include, but are not limited to, methyl gluceth-10, PEG-20 methyl glucose distearate, PEG-20 methyl glucose sesquistearate, $C_{11-15}$ pareth-20, ceteth-8, ceteth-12, dodoxynol-12, laureth-15, PEG-20 castor oil, polysorbate 20, steareth-20, polyoxyethylene-10 cetyl ether, polyoxyethylene-10 stearyl ether, polyoxyethylene-20 cetyl ether, polyoxyethylene-10 oleyl ether, polyoxyethylene-20 oleyl ether, an ethoxylated nonylphenol, ethoxylated octylphenol, ethoxylated dodecylphenol, ethoxylated fatty ($C_{8-22}$) alcohol, including 3 to 20 ethylene oxide moieties, polyoxyethylene-20 isohexadecyl ether, polyoxyethylene-23 glycerol laurate, PEG 80 sorbitan laurate, polyoxy-ethylene-20 glyceryl stearate, PPG-10 methyl glucose ether, PPG-20 methyl glucose ether, polyoxyethylene-20 sorbitan monoesters, polyoxyethylene-80 castor oil, polyoxyethylene-15 tridecyl ether, polyoxy-ethylene-6 tridecyl ether, laureth-2, laureth-3, laureth-4, PEG-3 castor oil, PEG 600 dioleate, PEG 400 dioleate, and mixtures thereof.

The liquid wipe compositions may also further contain preservatives. Suitable preservatives for use in the present compositions may include, for instance, Kathon CG, which is a mixture of methylchloroisothiazolinone and methylisothiazolinone available from Rohm & Haas of Philadelphia, Pa.; Neolone 950®, which is methylisothiazolinone available from Rohm & Haas of Philadelphia, Pa., DMDM hydantoin (e.g., Glydant Plus available from Lonza, Inc. of Fair Lawn, N.J.); iodopropynyl butylcarbamate; benzoic esters (parabens), such as methylparaben, propylparaben, butylparaben, ethylparaben, isopropylparaben, isobutylparaben, benzylparaben, sodium methylparaben, and sodium propylparaben; 2-bromo-2-nitropropane-1,3-diol; benzoic acid; imidazolidinyl urea; diazolidinyl urea; and the like. Still other preservatives may include ethylhexylglycerin, phenoxyethanol caprylyl glycol, a blend of 1,2-hexanediol, caprylyl glycol and tropolone, and a blend of phenoxyethanol and tropolone.

The liquid wipe compositions may additionally include adjunct components conventionally found in pharmaceutical compositions in their art-established fashion and at their art-established levels. For example, the compositions may contain additional compatible pharmaceutically active materials for combination therapy, such as antimicrobials, antioxidants, anti-parasitic agents, antipruritics, antifungals, antiseptic actives, biological actives, astringents, keratolytic actives, local anesthetics, anti-stinging agents, anti-reddening agents, skin soothing agents, and combinations thereof. Other suitable additives that may be included in the compositions of the present disclosure include colorants, deodorants, fragrances, perfumes, emulsifiers, anti-foaming agents, lubricants, natural moisturizing agents, skin conditioning agents, skin protectants and other skin benefit agents (e.g., extracts such as aloe vera and anti-aging agents such as peptides), solvents, solubilizing agents, suspending agents, wetting agents, humectants, pH adjusters, buffering agents, dyes and/or pigments, and combinations thereof.

The wet wipes, as disclosed herein, do not require organic solvents to maintain in-use strength, and the liquid wipe composition may be substantially free of organic solvents. Organic solvents may produce a greasy after-feel and cause irritation in higher amounts. However, small amounts of organic solvents may be included in the liquid wipe composition for different purposes other than maintaining in-use wet strength. In one embodiment, small amounts of organic solvents (less than about 1%) may be utilized as fragrance or preservative solubilizers to improve process and shelf stability of the liquid wipe composition. The liquid wipe composition may desirably contain less than about 5 weight percent of organic solvents, such as propylene glycol and other glycols, polyhydroxy alcohols, and the like, based on the total weight of the liquid wipe composition. More desirably, the liquid wipe composition may contain less than about 3 weight percent of organic solvents. Even more desirably, the liquid wipe composition may contain less than about 1 weight percent of organic solvents.

The wet wipes, as disclosed herein, desirably may be made to have sufficient tensile strength, sheet-to-sheet adhesion, calculated per layer stack thickness and flexibility.

The wet wipes may be prepared using a wipe substrate with a fibrous material and a binder composition forming a nonwoven airlaid web. These wet wipes made with nonwoven web may also be made to be usable without breaking or tearing, to be consumer acceptable, and provide problem-free disposal once disposed in a household sanitation system. The wet wipes may also be prepared using a coform substrate as described above.

The wet wipe formed with a nonwoven web desirably may have a machine direction tensile strength ranging from at least about 100 gf/in to about 1000 gf/in. More desirably, the wet wipe may have a machine direction tensile strength ranging from at least about 200 gf/in to about 800 gf/in. Even more desirably, the wet wipe may have a machine direction tensile strength ranging from at least about 300 gf/in to about 600 gf/in. Most desirably, the wet wipe may have a machine direction tensile strength ranging from at least about 350 gf/in to about 550 gf/in.

The wet wipe may be configured to provide all desired physical properties by use of a single or multi-ply wet wipe product, in which two or more plies of nonwoven material are joined together by methods known in the art to form a multi-ply wipe.

The total basis weight of the nonwoven material, consisting of a single or multiple layers of nonwoven material in the final wet wipe product, may be in the range of at least about 25 gsm to about 120 gsm. More desirably, the basis weight of the nonwoven material may be between about 40 gsm and 90 gsm. Even more desirably, the basis weight of the nonwoven material may be between about 60 gsm and 80 gsm. Especially more desirably, the basis weight of the nonwoven material may be between about 70 and 75 gsm.

Preferably, as described earlier, the sheet-to-sheet adhesion of the wet wipe formed from the nonwoven airlaid web in the final packaged product may be lower, in able to provide easier dispensing of the wet wipe. Accordingly, the wet wipes formed from a nonwoven web, as disclosed herein, may desirably have a sheet-to-sheet adhesion less than about 3 gf/in.

Consumers of wet wipes generally prefer wet wipes having an increased thickness. One way to compare the thickness of wet wipes is to calculate the per layer stack thickness by measuring the overall stack height for the stack, dividing the stack height by the stack count or number of individual sheets in the stack, and dividing the result by a factor of 2 since each folded sheet contributes approximately two layers. However, such a calculation fails to account for differing basis weights of the basesheet material. Generally, for a given type of material, an increase in basis weight produces an increase in the sheet's thickness. Typical basesheet materials used to make wet wipes often have a dry basis weight between about 45 gsm to about 75 gsm with material close to 60 gsm being fairly common. Thus, one way to compare the calculated stack thickness per layer for different stacks is to normalize for differences in the basis weight of the basesheet material used to make the wet wipes. Since a common basis weight for wet wipes is approximately 60 gsm, the actual basis weight of the basesheet material in the stack can be normalized to 60 gsm.

Therefore, the calculated per layer stack thickness can be determined by the following equation:

$$\text{Calculated per layer stack thickness(mm)} = [(\text{Stack Height(mm)}/\text{Sheet Count}) \times (60(\text{gsm})/\text{Basis Weight(gsm)})]/2(\text{layers per sheet})$$

The calculated per layer stack thickness of the wet wipe formed from the nonwoven airlaid web and incorporating the organopolysiloxane may be in the range of about 0.4 mm to about 0.5 mm. The calculated per layer stack thickness of the wet wipe formed from the coform and incorporating the organopolysiloxane may be in the range of about 0.6 mm to about 0.7 mm.

Cup crush values can be used as an indication of flexibility of materials that may contact the skin, such as a wipe. Lower cup crush values indicate an increased feeling of gentleness of the wipe and flexibility of the wipe as it glides across the skin.

Typically, the cup crush value for a wet wipe formed from the nonwoven airlaid web incorporating the organopolysiloxane of the present disclosure will be from about 900 to about 1150 g/cm$^3$. The cup crush value for a wet wipe formed from the coform incorporating the organopolysiloxane of the present disclosure will be from about 900 to about 1150 g/cm$^3$. Dynamic cup crush values may be measured as described in the examples.

As mentioned previously, the wet wipes formed from the nonwoven airlaid web, may be sufficiently dispersible so that they lose enough strength to break apart in tap water under conditions typically experienced in household or municipal sanitation systems. Also mentioned previously, the tap water used for measuring dispersibility should encompass the concentration range of the majority of the components typically found in the tap water compositions that the wet wipe would encounter upon disposal. Previous methods for measuring dispersibility of the nonwoven materials, whether dry or pre-moistened, have commonly relied on systems in which the material was exposed to shear while in water, such as measuring the time for a material to break up while being agitated by a mechanical mixer. Constant exposure to such relatively high, uncontrolled shear gradients offers an unrealistic and overly optimistic test for products designed to be flushed in a toilet, where the level of shear is extremely weak or brief. Shear rates may be negligible, for example once the material enters a septic tank. Thus, for a realistic appraisal of wet wipe dispersibility, the test methods should simulate the relatively low shear rates the products will experience once they have been flushed in the toilet.

A static soak test, for example, should illustrate the dispersibility of the wet wipe after it is fully wetted with water from the toilet and where it experiences negligible shear, such as in a septic tank. Desirably, the wet wipe may have less than about 100 gf/in of tensile strength after 5 hours when soaked in water with a total dissolved solids up to 500 ppm and a CaCO$_3$ equivalent hardness up to about 250 ppm. More desirably, the wet wipe may have less than about 100 gf/in of tensile strength after 3 hours when soaked in water with a total dissolved solids up to 500 ppm and a CaCO$_3$ equivalent hardness up to about 250 ppm. Even more desirably, the wet wipe may have less than about 100 gf/in of tensile strength after one hour when soaked in water with a total dissolved solids up to 500 ppm and a $CaCO_3$ equivalent hardness up to about 250 ppm.

After flushing in the toilet in a household or building, the wet wipe may enter into the sanitary sewer system through pipes referred to as sewer laterals. In sewer laterals, the motion of the water typifies a "gentle sloshing" or wave-like motion. A "slosh box" is a box or a container that rocks back and forth with water inside, thereby creating a wave front and subjecting the wet wipe to intermittent motion that is capable of mimicking the "gentle sloshing" motion that the wet wipe would experience in sewer laterals. While the slosh box may be more vigorous than the actual action in a sewer lateral, the method is more representative of the lateral movement the wet wipe would experience than the higher shear methods described above. Desirably, the wet wipe will break-up in the slosh box to pieces of size less than about one inch square in area. Dispersion of the wet wipe to pieces of about this size or smaller may be sufficient to allow the pieces to pass through the bar screens typically found in municipal sanitary sewer treatment facilities and not cause problems or blockages in households.

In one embodiment, the wet wipe may break up into pieces of less than about one inch square in a slosh box in less than about 500 minutes in water with a total dissolved solids up to 500 ppm and a $CaCO_3$ equivalent hardness up to about 250 ppm. In another embodiment, the wet wipe may desirably break up into pieces of less than about one inch square in area in a slosh box in less than about 300 minutes in water with a total dissolved solids up to 500 ppm and a $CaCO_3$ equivalent hardness up to about 250 ppm. In a further embodiment, the wet wipe may more desirably break up into pieces of less than about one inch square in area in a slosh box in less than about 100 minutes in water with a total dissolved solids up to 500 ppm and a $CaCO_3$ equivalent hardness up to about 250 ppm. In another embodiment, the wet wipe may even more desirably break up into pieces of less than about one inch square in area in a slosh box in less than about 60 minutes in water with a total dissolved solids up to 500 ppm and a $CaCO_3$ equivalent hardness up to about 250 ppm.

Desirably, the wet wipes, as disclosed herein, may possess an in-use wet tensile strength of at least about 150 gf/in when wetted with 10% to 400% of the wetting composition by weight relative to the weight of the nonwoven material, and a tensile strength of less than about 100 gf/in when soaked in water with a total dissolved solids up to 500 ppm and a $CaCO_3$ equivalent hardness up to about 250 ppm after about 24 hours or less, desirably after about one hour.

Most desirably, the wet wipes, as disclosed herein, may possess an in-use wet tensile strength greater than about 300 gf/in when wetted with 10% to 400% of the wetting composition by weight relative to the nonwoven material, and a tensile strength of less than about 100 gf/in when soaked in water with a total dissolved solids up to 500 ppm and a $CaCO_3$ equivalent hardness up to about 250 ppm after about 24 hours or less, desirably after about one hour.

In a further embodiment, the wet wipes, as disclosed herein, may possess an in-use wet tensile strength greater than about 300 gf/in when wetted with 10% to 400% of the wetting composition by weight relative to the weight of the nonwoven material, and a slosh box break-up time of less than about 300 minutes in water with a total dissolved solids up to 500 ppm and a $CaCO_3$ equivalent hardness up to about 250 ppm.

The wet wipe preferably maintains its desired characteristics over the time periods involved in warehousing, transportation, retail display and storage by the consumer. In one embodiment, shelf life may range from two months to two years.

The wet wipes, as disclosed herein, are illustrated by the following examples, which are not to be construed in any way as imposing limitations upon the scope thereof. On the contrary, it is to be clearly understood that resort may be had to various other embodiments, modifications, and equivalents thereof, which, after reading the description herein, may suggest themselves to those skilled in the art without departing from the spirit and/or the scope of the appended claims.

Test Methods

Sheet-to-Sheet Adhesion Test Method

A 180° t-peel measurement was used to determine the sheet-to-sheet adhesion between adjacent wet wipe surfaces. The method for the 180° t-peel measurement is based upon ASTM D1876-01 Standard Test Method for Peel Resistance of Adhesives (T-Peel Test) with the following modifications. A crosshead speed of 20 inches/minute with a gauge length of 1.5 inches was used for all measurements. Measurements were recorded between 0.5 inches and 6.0 inches, with the end test point at 6.5 inches. Wet wipes were aged prior to measurement according as described in the examples. The aged wipes were cut into samples 1 inch wide with a depth of at least two layers thick.

Wet Wipe in-Use Tensile Strength Measurements

For purposes herein, tensile strength may be measured using a Constant Rate of Elongation (CRE) tensile tester using a 1-inch jaw width (sample width), a test span of 3 inches (gauge length), and a rate of jaw separation of 25.4 centimeters per minute after maintaining the sample at the ambient conditions of 23±2° C. and 50±5% relative humidity for 4 hours before testing the sample at the same ambient conditions. The wet wipes were removed from the package, with 1" wide strips cut from the center of the wipes in the specified MD direction. The "MD tensile strength" is the peak load in grams-force per inch of sample width when a sample is pulled to rupture in the machine direction.

The instrument used for measuring tensile strength is an MTS Systems Sintech 1/D model. The data acquisition software is MTS TestWorks® for Windows Ver. 4.0 commercially available from MTS Systems Corp., Eden Prairie, Minn. The load cell is an MTS 100 Newton maximum load cell. The gauge length between jaws is 3±0.04 inches. The top and bottom jaws are operated using pneumatic-action with maximum 90 P.S.I. The break sensitivity is set at 40%. The data acquisition rate is set at 100 Hz (i.e. 100 samples per second). The sample is placed in the jaws of the instrument, centered both vertically and horizontally. The test is then started and ends when the force drops by 40% of peak. The peak load expressed in grams-force is recorded as the "MD tensile strength" of the specimen. At least twelve representative specimens are tested for each product and its average peak load is determined.

Cup Crush Measurement

As used herein, the term "cup crush" refers to one measure of the softness of a nonwoven fabric sheet that is determined according to the "cup crush" test. The test is generally performed as discussed in detail in U.S. patent application Ser. No. 09/751,329, hereby incorporated by reference. The cup crush test evaluates fabric stiffness by measuring the peak load (also called the "cup crush load" or just "cup crush") required for a 4.5 cm diameter hemispherically shaped foot to crush a 17.8 cm by 17.8 cm piece of fabric shaped into an approximately 6.5 cm diameter by 6.5 cm tall cup shape, while the now cup shaped fabric is surrounded by an approximately 6.5 cm diameter cylinder cup to maintain a uniform deformation of the cup shaped fabric. There can be gaps between a ring (not shown) and the forming cup, but at least four corners of the fabric must be fixedly pinched there between. The foot and cylinder cup are aligned to avoid contact between the cup walls and the foot that could affect the readings. The load is measured in grams, and recorded a minimum of twenty times per second while the foot is descending at a rate of about 406 mm per minute. The cup crush test provides a value for the total energy required to crush a sample (the "cup crush energy") which is the energy over a 4.5 cm range beginning about 0.5 cm below the top of the fabric cup, i.e., the area under the curve formed by the load in grams on one axis and the distance the foot travels in millimeters on the other. Cup crush energy is reported in gm-mm (or pounds-inch). A lower cup crush value indicates a softer material. A suitable device for measuring cup crush is a model FTD-G-500 load cell (500 gram range) available from the Schaevitz Company, Pennsauken, N.J.

Stack Height Measurement

Gently remove the wet wipes stack from the container it is packaged in and place onto a smooth level surface without bunching, shifting, or otherwise disturbing the wet wipes within the stack. The stack height is measured using a thin (⅛ inch or less), flat aluminum platen having a size slightly larger than the surface area of the stack's top that is placed onto the stack's top, or by placing the straight edge of a metal ruler lightly onto the stack's top surface. The stack height should be measured to the nearest mm by measuring the distance between the top of the reference surface the stack is placed on and the bottom edge of the platen or ruler touching the stack's top. If the top surface of the stack is slightly uneven, the largest height measured is recorded ignoring loose, wrinkled, or obviously displaced sheets at the top surface. If wrinkled or displaced sheets are present, the stack should be discarded and a new stack measured. At least three stack height measurements are obtained for each sample being tested. The average of the three individual measurements is recorded as the stack height.

After measuring the stack height, the number of sheets within the stack should be determined by dispensing the stack and counting each individual sheet.

Basis Weight

The dry basis weight of the basesheet material forming the wet wipes in the stack can be obtained using the ASTM active standard D646-96 (2001), Standard Test Method for Grammage of Paper and Paperboard (Mass per Unit Area), or an equivalent method.

EXAMPLE 1

A weak, 50 gsm, 1 mm thick thermally-bonded airlaid (TBAL) fibrous material was cut into 10"×13" handsheets. The thermally-bonded airlaid material was prepared as described in U.S. Patent Application Publication No. 2004/0063888, which is incorporated herein by reference in its entirety. A binder composition of a cationic polyacrylate that is the polymerization product of 96 mol % methyl acrylate and 4 mol % [2-(acryloyloxy)ethyl]trimethyl ammonium chloride and Airflex® EZ123 in a 70:30 ratio was used to bond the substrate. The TBAL handsheets were treated with the binder composition at 15 wt % solids using a pressurized spray unit to achieve a final 24% total content of binder composition in the handsheets. The resulting lab-prepared airlaid nonwoven material basesheet was manually removed and dried in a Werner Mathis, Model LTV Through-Air Dryer.

Each 10"×13" airlaid nonwoven material was die cut into two 7.5"×5.5" dry wipes, with the shorter direction being the machine-direction (MD) direction. A standard plastic pipette was used to apply 235% by weight average add-on of a wetting composition that is used on commercially available wet wipes under the trade designation KLEENEX® COTTONELLE FRESH® Folded Wipes (Kimberly-Clark Corporation of Neenah, Wis.) but containing 2 wt % sodium chloride (insolubilizing agent) and an additive to each side of the wipe. A stack of 10 wetted wipes was then formed and placed into a plastic baggie. The stack of 10 wet wipes in the plastic bag was compressed using a 22 pound roller, by rolling the bag four times. The bag was then sealed and the compressed stack of TBAL wet wipes was then aged under 1000 grams of weight for 3 days. The stack was then transferred to a 46° C. oven for an additional 24 hours before testing.

Several exemplary and comparative wet wipes were prepared with different treatments. The liquid wipe compositions used to prepare the wet wipes with different treatments had added thereto either an organopolysiloxane of the present disclosure or comparative treatments containing a different type of silicone or containing no additive. Illustrative results of different treatments are set forth below in Table 1. In this example, the sheet-to-sheet adhesion and in-use tensile strength of wet wipes was determined using the methods described in the Test Methods section.

TABLE 1

| Treatment | Additive | Wt. % Additive (by wt. of composition) | Sheet Adhesion (gf/inch) | In-Use Tensile Strength (MD) (gf/inch) |
|---|---|---|---|---|
| Comparative 1 | None | — | 5.3 | 427 |
| 2 | organopolysiloxane (KF 889) | 2.0 | 3.1 | 475.1 |
| 3 | Organopolysiloxane (KF 889) | 1.0 | 3.8 | 385 |
| 4 | Organopolysiloxane (KF 889) | 3.0 | 2.5 | 407 |
| Comparative 5 | Dimethiconol and TEA-dodecylbenzene sulfonate (DM 60081 VP commercially available from Wacker-Belsil) | 3.0 | 4.3 | 378 |
| Comparative 6 | Dimethiconol and TEA-dodecylbenzene sulfonate (DM 60081 VP commercially available from Wacker-Belsil) | 0.5 | 5.6 | 400 |
| Comparative 7 | Amino quaternized silicone terpolymer (Silsoft Q commercially available from GE) | 2.0 | 5.0 | 435 |
| Comparative 8 | Dimethicone PEG-7 Isostearate (Silwax WD-IS commercially available from Siltech LLC) | 2.0 | 5.6 | 412 |

As can be seen from these results, the presence of an organopolysiloxane in a wet wipe composition lowers sheet-to-sheet adhesion of wet wipes. The sheet-to-sheet adhesion strength for a control wet wipe having liquid wipe composition without an additive (Comparative Treatment 1) is typically about 5.3 gf/inch. As can be seen from the results obtained for Treatments 2-4, inclusion of an organopolysiloxane in a wet wipe composition improves sheet adhesion as compared to untreated controls.

In addition, Comparative Treatments 5-8 include representative samples of other types of silicones included in the liquid wipe composition. The comparative examples contain organopolysiloxanes that have too much organo functionalization and therefore do not provide the sheet adhesion benefit. The sheet-to-sheet adhesion strength for a wet wipe having liquid wipe composition without this functionalization (Treatments 5-8) is typically between about 4.3 gf/inch to 5.6 gf/inch. As can be seen from the results obtained for Treatments 2-4, inclusion of an organopolysiloxane in a wet wipe composition improves sheet adhesion as compared to wet wipe compositions having too much organo functionalization.

which were adhesively joined, fan-folded and applied with the wetting composition at 235% add-on to yield a fan-folded stack of wet wipes. The fan-folded stacks contained 33 5.5"× 7" wet wipes which were packaged into shrink-wrapped plastic tubs for a stack count of 33. A liquid wipe composition that is used on commercially available wet wipes under the trade designation KLEENEX® COTTONELLE FRESNO Folded Wipes (Kimberly-Clark Corporation of Neenah, Wis.) with the addition of 2 wt % sodium chloride and an additive is used in the converting process. Several exemplary and comparative wet wipes were prepared with different treatments. The liquid wipe compositions used to prepare the wet wipes with different treatments had added thereto either organopolysiloxane of the present disclosure, or comparative examples having a different type of silicone or no additive. Illustrative results of different treatments are set forth below in Table 2.

TABLE 2

| Treatment | Additive | Wt. % Additive (by wt. of composition) | Sheet Adhesion (gf/inch) | In-Use Tensile Strength (MD) (gf/inch) | Stack Height (mm) | Basis Weight (gsm) | Calculated Per Layer Stack Thickness (mm) | Cup Crush (g/cubic cm) |
|---|---|---|---|---|---|---|---|---|
| Comparative 9 | none | — | 7.28 | 277 | 30 | 71.1 | 0.38 | 1246.7 |
| 10 | Organopolysiloxane (KF 889) | 0.5 | 2.64 | 219 | 33 | 70.95 | 0.42 | 1092.1 |
| 11 | Organopolysiloxane (KF 889) | 0.75 | 2.55 | 405 | 36 | 70.95 | 0.46 | 969.6 |
| 12 | Organopolysiloxane (2% Abil 3273) | 2 | 2.89 | 396 | 36 | 70.95 | 0.46 | 1109.7 |
| Comparative 13 | Polyether-amino-functional silicone fluid (Wetsoft 230S commercially available from Wacker Chemie AG) | 2 | 4.02 | 388 | 35 | 70.95 | 0.45 | 1235.2 |

EXAMPLE 2

In this example, a basesheet of airlaid nonwoven web was formed continuously on a commercial scale airlaid machine similar to the pilot-scale machine. Weyerhauser CF405 bleached softwood kraft fiber in pulp sheet form was used as the fibrous material. This airlaid fibrous material was densified to the desired level by heated compaction rolls and transferred to an oven wire, where it was sprayed on the top side with the a binder composition of a cationic polyacrylate that is the polymerization product of 96 mol % methyl acrylate and 4 mol % [2-(acryloyloxy)ethyl]trimethyl ammonium chloride and Airflex® EZ123 in a 70:30 ratio was used to bond the substrate binder composition, applying approximately half of the desired binder solids onto the dry fibrous material.

A series of Unijet® nozzles, Nozzle type 730077, manufactured by Spraying Systems Co., Wheaton, Ill., operating at approximately 70-120 psi were used to spray the binder composition onto the fibrous material. Each binder composition was sprayed at approximately 15% binder solids with water as the carrier. The wet partially formed nonwoven web was carried through an oven operating at 350-400° F. to provide the dry partially formed nonwoven web. The dry partially formed nonwoven web was then turned over, transferred onto another wire and passed under another three spray booms to add the other half of the desired binder composition, for a total weight percent of 18-20% binder solids relative to the dry mass of the nonwoven web. The nonwoven web was then passed through a second oven section as described above, to complete the drying of the nonwoven web.

The basesheet was machine-converted into sections of continuous web 5.5" wide by 56" long with perforations every 7"

As can be seen from these results, the presence of an organopolysiloxane as described herein in a wet wipe composition lowers sheet-to-sheet adhesion of wet wipes. The sheet-to-sheet adhesion strength for a control wet wipe having liquid wipe composition without an additive (Comparative Treatment 9) is typically about 7.28 gf/inch. As can be seen from the results obtained for Treatments 10-12, inclusion of an organopolysiloxane as described herein in a wet wipe composition improves sheet adhesion as compared to untreated controls.

In addition, Comparative Treatment 13 includes representative samples of other types of silicones included in the liquid wipe composition. The comparative examples contain organopolysiloxanes that have too much organo functionalization and therefore do not provide the sheet adhesion benefit. The sheet-to-sheet adhesion strength for a wet wipe having liquid wipe composition without this functionalization (Treatment 13) is typically between about 4.02 gf/inch. As can be seen from the results obtained for Treatments 2-4, inclusion of an organopolysiloxane as described herein in a wet wipe composition improves sheet adhesion as compared to wet wipes having too much organo functionalization.

As can be seen from these results, the presence of an organopolysiloxane in a wet wipe composition increases the sheet thickness of wet wipes at the same basis weight. The calculated per layer stack thickness for a control wet wipe having liquid wipe composition without an additive (Comparative Treatment 9) is typically about 0.38 mm. As can be seen from the results obtained for Treatments 10-12, inclusion of an organopolysiloxane in a wet wipe composition decreases the calculated per layer stack thickness when compared to untreated controls to between about 0.4 and 0.5 mm.

Also seen from these results, the presence of an organopolysiloxane in a wet wipe composition increases the flexibility of wet wipes. The cup crush value for a control wet wipe having liquid wipe composition without an additive (Comparative Treatment 9) is typically about 1246.7 g/cm³. As can be seen from the results obtained for Treatments 10-12, inclusion of an organopolysiloxane in a wet wipe composition increases the cup crush value when compared to untreated controls to between about 900 and 1200 g/cm³.

EXAMPLE 3

Fibrous nonwoven structures containing wood pulp fibers and meltblown polypropylene fibers were produced in accordance with the process described in, for example, U.S. Pat. Nos. 4,100,324; 5,508,102; and in U.S. Patent Application Publication No. 2003/0211802, all of which are herein incorporated by reference. In the process, secondary pulp fibers, CF405 pulp commercially available from the Weyerhauser Company, are suspended in an air stream and contacted with two air streams of meltblown fibrous materials, Metocene MF650X, commercially available from Basell USA Inc., impinging the air stream containing secondary pulp fibers. The merged streams were directed onto a forming wire and collected in the form of a fibrous nonwoven coform structure.

The basesheet was machine-converted into sections of continuous web 5.5" wide by 56" long with perforations every 7" which were adhesively joined, fan-folded and applied with the liquid wipe composition at 250% add-on to yield a fan-folded stack of wet wipes. The fan-folded stacks contained 32 5.5"×7" wet wipes which were packaged into shrink-wrapped plastic tubs for a stack count of 32. A liquid wipe composition that is used on commercially available wet wipes under the trade designation KLEENEX® COTTONELLE FRESNO Folded Wipes (Kimberly-Clark Corporation of Neenah, Wis.) with the addition of 2 wt % sodium chloride and an additive is used in the converting process. Several exemplary and comparative wet wipes were prepared with different treatments. The liquid wipe compositions used to prepare the wet wipes with different treatments had added thereto either organopolysiloxane of the present disclosure, or comparative examples having a different type of silicone or no additive. Illustrative results of different treatments are set forth below in Table 3.

TABLE 3

| Treatment | Additive | Wt. % Additive (by wt. of composition) | In-Use Tensile Strength (MD) (gf/inch) | Stack Height (mm) | Basis Weight (gsm) | Calculated Per Layer Stack Thickness (mm) | Cup Crush (g/cubic cm) |
|---|---|---|---|---|---|---|---|
| Comparative 14 | none | — | 680 | 39 | 66.1 | 0.55 | 1202.4 |
| 15 | Organopolysiloxane (KF 889) | 0.5 | 609 | 46 | 66.1 | 0.65 | 1087.1 |

As can be seen from these results, the presence of an organopolysiloxane as described herein in a wet wipe composition increases the sheet thickness of wet wipes at the same basis weight. The calculated per layer stack thickness for a control wet wipe having liquid wipe composition without an additive (Comparative Treatment 9) is typically about 0.55 mm. As can be seen from the results obtained for Treatments 10-12, inclusion of an organopolysiloxane as described herein in a wet wipe composition decreases the calculated per layer stack thickness when compared to untreated controls to between about 0.6 and 0.7 mm.

Also seen from these results, the presence of an organopolysiloxane as described herein in a wet wipe composition increases the flexibility of wet wipes. The cup crush value for a control wet wipe having liquid wipe composition without an additive (Comparative Treatment 9) is typically about 1202 g/cm³. As can be seen from the results obtained for Treatments 10-12, inclusion of an organopolysiloxane as described herein in a wet wipe composition increases the cup crush value when compared to untreated controls to between about 900 and 1100 g/cm³.

Other modifications and variations to the appended claims may be practiced by those of ordinary skill in the art, without departing from the spirit and scope as set forth in the appended claims. It is understood that features of the various examples may be interchanged in whole or part. The preceding description, given by way of example in order to enable one of ordinary skill in the art to practice the claimed invention, is not to be construed as limiting the scope of the invention, which is defined by the claims and all equivalents thereto.

What is claimed is:

1. A wet wipe comprising:
   a wipe substrate; and
   a liquid wipe composition having an organopolysiloxane having the following structure:

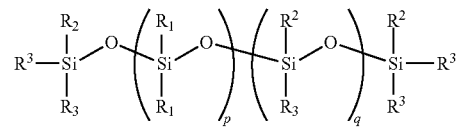

wherein p+q=1 to 2000, $R^1$ is independently selected from a monovalent hydrocarbon group or hydroxyl group, and $R^2$ and $R^3$ are independently selected from a monovalent hydrocarbon group, a hydroxyl group, a monovalent hydrocarbon group functional in amine, a monovalent hydrocarbon group functional in polyether, a monovalent hydrocarbon group functional in quaternary, and a monovalent hydrocarbon group functional in polyampholyte.

2. The wet wipe of claim 1 wherein $R^1$ is selected from alkyl, aryl and alkoxy groups.

3. The wet wipe of claim 1 wherein the monovalent hydrocarbon group functional in polyether is a monovalent organic group containing at least one polyether radical having the following structure:

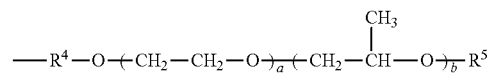

wherein $R^4$ is a divalent hydrocarbon group of 1 to 6 carbon atoms, $R^5$ is a monovalent hydrocarbon group of 1 to 10 carbon atoms or hydrogen; the ratio of a to b is from 0 to 1, and a+b=from 2 to 20.

4. The wet wipe of claim 1 wherein the monovalent hydrocarbon group functional in amine is a monovalent organic group containing at least one amine radical having the following structure:

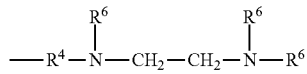

wherein $R^4$ is a divalent hydrocarbon group of 1 to 6 carbon atoms; $R^6$ is either hydrogen, or a monovalent polyether functional hydrocarbon radical having the following structure:

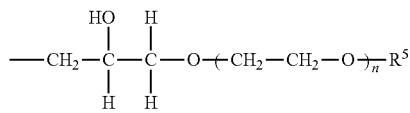

wherein $R^5$ is a monovalent hydrocarbon group of 1 to 10 carbon atoms or hydrogen.

5. The wet wipe of claim 1 wherein the monovalent hydrocarbon group functional in quaternary is a monovalent organic group containing at least one quaternary amine radical having the following structure:

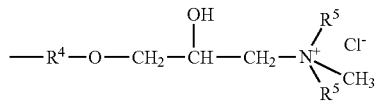

wherein $R^4$ is a divalent hydrocarbon group of 1 to 6 carbon atoms, and $R^5$ is a monovalent hydrocarbon group of 1 to 10 carbon atoms or hydrogen.

6. The wet wipe of claim 1 wherein the monovalent hydrocarbon group functional in polyampholyte is a monovalent organic group containing at least one amphoteric radical represented by the following structure:

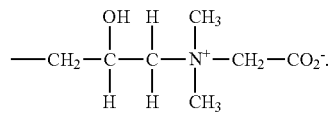

7. The wet wipe of claim 1 wherein $R^3$ is selected from the monovalent hydrocarbon group functional in amine, the monovalent hydrocarbon group functional in polyether, the monovalent hydrocarbon group functional in quaternary, and the monovalent hydrocarbon group functional in polyampholyte.

8. The wet wipe of claim 1 wherein the liquid wipe composition comprises from about 0.05% (by weight of the liquid wipe composition) to about 5% (by weight of the composition) of the organopolysiloxane.

9. The wet wipe of claim 5 wherein the liquid wipe composition comprises from about 0.1% (by weight of the composition) to about 2% (by weight of the composition) of the organopolysiloxane.

10. The wet wipe of claim 1 wherein the liquid wipe composition further comprises from about 75% (by weight of the composition) to about 99% (by weight of the composition) of water.

11. The wet wipe of claim 1 wherein the wipe substrate is a nonwoven web comprising:
  a fibrous material; and
  a binder composition.

12. The wet wipe of claim 11 wherein the wet wipe has sheet-to-sheet adhesion of less than 3 gf/in.

13. The wet wipe of claim 11 wherein the wet wipe has a calculated per layer stack thickness of between about 0.4 and 0.5 mm.

14. The wet wipe of claim 11 wherein the wet wipe has a cup crush value of between 800 and 1150 g/cm$^3$.

15. The wet wipe of claim 1 wherein the wipe substrate is coform.

16. The wet wipe of claim 15 wherein the wet wipe has a calculated per layer stack thickness of between 0.6 and 0.7 mm.

17. The wet wipe of claim 15 wherein the wet wipe has a cup crush value of between 900 and 1150 g/cm$^3$.

* * * * *